Nov. 30, 1926.
G. B. DURELL
SHOVEL
Original Filed Feb. 4, 1922
1,608,730
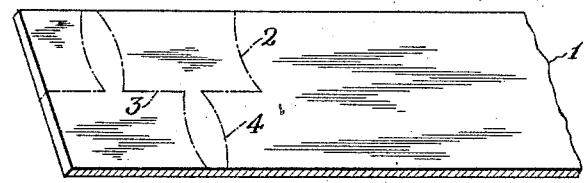
FIG. 1.
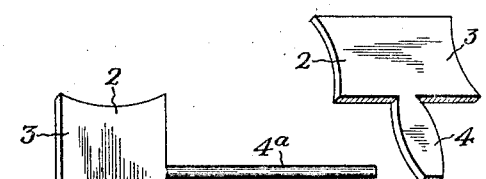
FIG. 2.
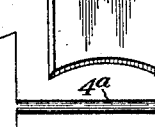
FIG. 3.
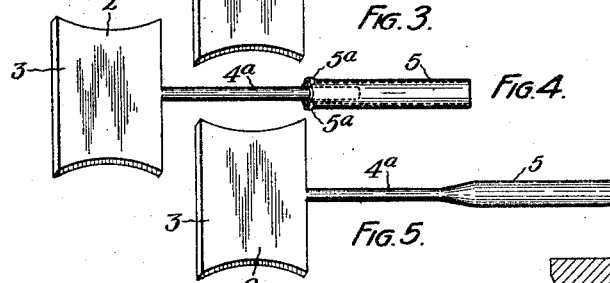
FIG. 4.
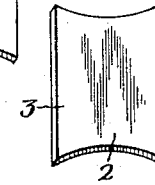
FIG. 5.
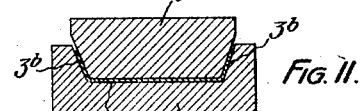
FIG. 11.
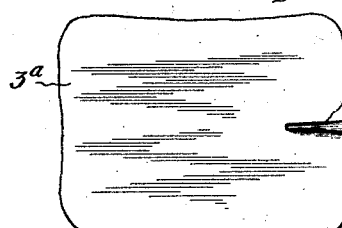
FIG. 6.
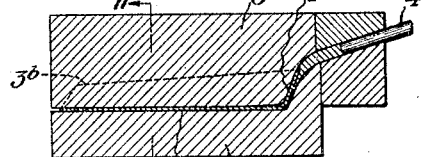
FIG. 10.
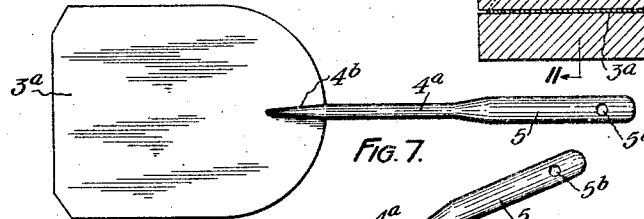
FIG. 7.
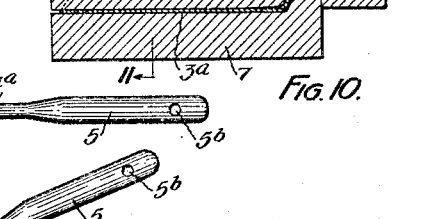
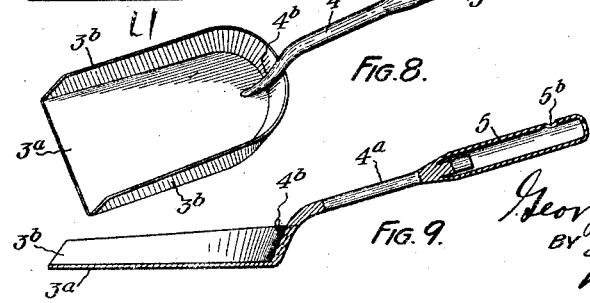
FIG. 8.
FIG. 9.
INVENTOR:
George B. Durell
BY
Ray A. Kehr
ATTORNEY.

Patented Nov. 30, 1926.

1,608,730

UNITED STATES PATENT OFFICE.

GEORGE B. DURELL, OF CLEVELAND, OHIO, ASSIGNOR TO THE UNION FORK AND HOE COMPANY, OF COLUMBUS, OHIO, A CORPORATION OF OHIO.

SHOVEL.

Original application filed February 4, 1922, Serial No. 534,030. Divided and this application filed July 30, 1924. Serial No. 729,024.

The invention relates to improvements in the form and construction of shovels. The improvements are especially applicable to shovels suited for domestic use in connection with stoves, furnaces and fireplaces, the present application being a division of my prior application Serial No. 534,030, filed February 4, 1922.

The chief object of the invention is the production of a shovel of suitable form for the uses last referred to, and having great strength and durability.

Other objects, more or less incidental to the foregoing, will appear in the following description in which the characteristics of my improved shovel will be pointed out in connection with the method of making it.

In the drawing, Fig. 1 is a perspective view of the flat bar stock from which the shovel blanks are stamped or punched, two of the blanks being shown in outline by dotted lines.

Fig. 2 is a perspective view of one of the blanks.

Fig. 3 is a perspective view of the blank after the shank part has been drawn out.

Fig. 4 is a fragmentary view of the end of the shank with a hollow handle mounted on the end of it preparatory to welding.

Fig. 5 is a perspective view of the blank with the shank drawn out and the handle welded on.

Fig. 6 is a plan view of the shovel after the body part has been rolled out in the form of a thin blade.

Fig. 7 is a similar view of the shovel after the blade or body part has been trimmed.

Fig. 8 is a perspective view of the finished shovel.

Fig. 9 is a longitudinal section of the shovel, with a portion of the shank shown in elevation.

Fig. 10 is a longitudinal section through the dies in which the flange is formed on the body of the shovel.

Fig. 11 is a section on the line 11—11, Fig. 10.

Starting with flat bar stock 1, the blanks 2 are stamped out by means of a suitable heavy punch press, the bar stock being heated to a suitable temperature for this purpose in accordance with the usual practice in work of this character. Each blank comprises a body part, 3, and a shank part, 4. Next, each blank has its shank part 4 drawn out to the rod-like form $4^a$, shown in Fig. 3. This can be done in any suitable manner, but preferably the blank, suitably heated, is grasped with tongs by the body section 3, and the operator presents the hot shank section 4 between suitable rolls. Rolls adapted for this purpose have semi-cylindrical working faces with a series of grooves graduated in size so that the metal is gradually reduced in cross section as it is passed through the successively smaller grooves. As is well understood, in the operation of this type of rolls the work is inserted between the working faces as they approach each other, rotating toward the operator.

When the shank has been rolled out to the form $4^a$, a section of pipe or tubing 5, is mounted on the end thereof and temporarily secured in position, as indicated in Fig. 4. The handle 5 can be temporarily secured against displacement on the shank in any suitable manner, but I prefer to do this by pinching or swaging the metal of the tube at $5^a$, $5^a$, in a punch press.

The shank and handle parts are now heated and welded together. This I preferably accomplish by means of a drop hammer, the dies of which are formed with a series of die cavities or grooves which vary in size and form so that the handle is by a series of two or three operations under the hammer, brought to the welded form shown in Fig. 5.

The body part 3 is now heated and rolled out to the relatively thin blade form $3^a$ shown in Fig. 6. In doing this, I prefer to first pass the body between the rolls transversely (with respect to the shank), rolls of the over-hanging type being employed to permit this. I prefer also that these rolls be of the mutilated or semi-cylindrical form previously referred to. One of the two rolls is formed with a groove so that a rib-like extension $4^b$ of the shank $4^a$ is formed on one side of the blade, as shown in Fig. 6. After the body is passed transversely between the rolls last referred to, it is given one or more longitudinal passes between other suitably formed rolls and this serves to roll the body section out to the thin blade form $3^a$ shown in Fig. 6.

These last named rolls are also preferably of the mutilated type and one of them is grooved to accommodate the rib 4$^b$.

The blade or body 3$^a$ is next trimmed to the form shown in Fig. 7, preferably by the use of a suitable die press.

Finally the blade section, having been suitably heated, is inserted between dies 6 and 7, as shown in Figs. 10 and 11, and subjected to sufficiently great pressure to form the body or blade 3$^a$ with a continuous upturned flange 3$^b$ along two sides and across the shank end of the body.

The shank or handle end of the shovel body is preferably made substantially semi-circular and the flange 3$^b$ extends around this circular end continuously and evenly and with entire freedom from corrugations. At the same time the said flange is turned up at a sharp angle to the plane of the flat bottom part of the body so that the shovel is well adapted for handling loose materials such as ashes, cinders, and the like. To produce this even, continuous flange around the end of the shovel I subject the metal in the dies to a pressure sufficient to cause the metal to flow between the dies and thus obviate the excess of metal that would otherwise exist in the upturned flange.

On reference to Fig. 10, it will be noted that the upper die is formed with a groove to accommodate the rib 4$^b$ which, when the shovel is brought to final form, extends as a continuation of the shank 4$^a$ down the flange and a short distance over the top of the flat bottom section of the shovel body.

When the shovel has been removed from the dies, the edge of the curved section of the flange 3$^b$ is ground off on an emery wheel or the like, to remove any unevenness resulting from the upward flow of the metal in the flange when it is formed between the dies.

At some stage in the production of the shovel after the handle 5 is welded to the shank, I drill a hole 5$^b$ through the handle large enough to pass over the head of a nail or the like, for the convenient hanging of the shovel.

Shovels made in accordance with my process as above described are exceedingly strong and durable, as the body and the shank parts of the shovel are literally in one piece, and the junction between the shank and body is re-enforced by the rib-like extension of the shank well into the body. Furthermore, the sharp angle of the flange 3$^b$ in relation to the bottom of the shovel body makes the structure exceedingly stiff and strong. As has been indicated above, the sharply upturned flange prevents loose materials from readily sliding off the shovel.

In the production of shovels of the class in question it has been customary heretofore to form the body and shank parts separately and rivet them together, and in forming the body the flange around the end is crimped or corrugated to accommodate the excess metal. The riveted joint always loosens up after a time, and the corrugated end of the flange, in addition to being unsightly, accumulates dirt and is hard to keep clean. These objections are entirely overcome by means of my improved form of construction.

My improved form of handle has the advantage that it is practically an integral part of the shank and at the same time is of suitable size for use and by reason of the circulation of air through it keeps comfortably cool when the shovel is used for handling hot coals or cinders.

While I have described the preferred form of construction, it will be understood that the construction can be varied within the scope of the appended claim.

What I claim as my invention is:

A forged metal shovel comprising in combination a thin sheet-like body with a flat bottom and a continuous sharply upturned flange across one end and two sides, the flanged end of the body being approximately semi-circular, an elongated rod-like shank integrally united with the flanged end of the body, said flanged end being thickened to form a rib-like extension of the shank to thereby strengthen the body at its junction with the shank, and a tubular handle secured to the end of the shank and having its end open for circulation of air.

In testimony whereof, I hereunto affix my signature.

GEORGE B. DURELL.